United States Patent [19]

Arikawa

[11] Patent Number: 4,776,644
[45] Date of Patent: Oct. 11, 1988

[54] ANTI-SKID CONTROL APPARATUS FOR A VEHICLE BRAKING SYSTEM

[75] Inventor: Tetsuro Arikawa, Kanagawa, Japan
[73] Assignee: Nippon A B S, Ltd., Tokyo, Japan
[21] Appl. No.: 903,498
[22] Filed: Sep. 2, 1986
[51] Int. Cl.⁴ .............................................. B60T 8/62
[52] U.S. Cl. .................................... 303/111; 303/104
[58] Field of Search ............. 188/181 A, 6 C; 303/92, 303/96, 98, 103, 104, 106, 109, 110, 111, 119

[56] References Cited

U.S. PATENT DOCUMENTS

| | | |
|---|---|---|
| 3,674,317 | 7/1972 | Mangold . |
| 3,907,377 | 9/1975 | Mayer . |
| 4,349,876 | 9/1982 | Lindemann ..................... 303/111 X |
| 4,374,421 | 2/1983 | Leiber ............................. 303/111 X |
| 4,451,096 | 5/1984 | Gygax ................................ 303/109 |
| 4,508,393 | 4/1985 | Drometer ........................... 303/111 |
| 4,547,022 | 10/1985 | Brearley et al. .................... 303/6 C |
| 4,593,955 | 6/1986 | Leiber ............................. 303/111 X |

*Primary Examiner*—Duane A. Reger
*Attorney, Agent, or Firm*—James P. Ryther

[57] ABSTRACT

An anti-skid control apparatus for a vehicle braking system in which front and rear wheels are diagonally connected, includes fluid pressure control valve devices arranged between fluid pressure generating chambers of a tandem master cylinder and brake apparatus for supplying a fluid pressure in accordance with the lower one of the brake fluid pressures of the front wheels controlled by the fluid pressure control valve devices. A control unit discriminates the side of the road having the lower frictional coefficient. The control signals of the front and rear wheels on the discriminated frictionally lower side of the road are combined logically with each other to control the first or second fluid pressure control valve devices so that the brake fluid pressures of the front and rear wheels on the frictionally lower side of the road and of the rear wheel on the frictionally higher of the road side are controlled. Also, the second or first fluid pressure control valve devices is controlled for independently controlling the brake fluid pressure of the front wheel on the frictionally higher side of the road.

10 Claims, 9 Drawing Sheets

ANTI-SKID CONTROL APPARATUS FOR A VEHICLE BRAKING SYSTEM

BACKGROUND OF THE INVENTION

2. Field of the Inventions

This invention relates to an anti-skid control apparatus for a vehicle braking system which can prevent the locking of the wheels.

2. Description of the Prior Art

Such an anti-skid control apparatus for a vehicle braking system is known and includes a fluid pressure control valve device arranged between a master cylinder and a wheel cylinder of a brake for the wheel. The fluid pressure control valve device receives control signals from a control unit which measures the skid condition of the wheel to control the brake fluid pressure to the wheel cylinder. A hydraulic reservoir which, when the brake fluid pressure to the wheel cylinder is decreased with the control of the fluid pressure control valve device, reserves the brake fluid discharged through the fluid pressure control valve device from the wheel cylinder. A pressure fluid supply conduit connects the master cylinder with the fluid pressure control valve device and a fluid pump returns the brake fluid from the hydraulic reservoir to the pressure fluid supply conduit.

When the fluid pressure control valve device is provided for each of the four wheels, and the fluid pressure of each are independently controlled, there is no problem with control operation. Or when the fluid pressure control valve device is provided for each of the front wheels, and for both of the rear wheels in common, there is no problem with control operation. In the latter case, the one common fluid pressure control valve device is controlled on the basis the lower one of the speeds of the rear wheels.

However, in the above cases, three or four fluid pressure control valve devices are used. Accordingly, the whole anti skid control apparatus is large sized, and very heavy. Moreover, since the fluid pressure control valve device is expensive, the anti-skid control is manufactured at a high cost.

For example, consider a system in which the brake fluid pressures of the front wheels are controlled by two fluid pressure control valve devices in the diagonal or X-type conduit system, and the brake fluid pressures of the rear wheels are controlled in common with the front wheels. It is possible that the vehicle runs on a road where the right and left sides are considerably different in frictional coefficient. In this situation the one rear wheel, which is diagonally connected to the one front wheel, riding on the higher frictional coefficient side will lock. In this case, the steering of the vehicle becomes unstable, and a very dangerous situation results.

Further, consider a system in which proportioning valves are provided for each of the rear wheels. In this system the brake fluid pressures of the rear wheels increase in proportion to the input fluid pressures to the proportioning valves. The problem of locking is not avoided.

Accordingly, an anti-skid control apparatus for a vehicle braking system which is small-sized and lightweight, has previously been proposed. This anti-skid braking system includes: a fluid pressure control valve device arranged between a master cylinder and a wheel cylinder of a brake for the wheel, the fluid pressure control valve device receives control signals of a control unit that measures the skid condition of the wheel to control the brake fluid pressure to that wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connects the master cylinder with the fluid pressure control valve device; and a fluid pump returns brake fluid from the hydraulic reservoir to the pressure fluid supply conduits. The fluid pressure control valve device provides for a pair of front wheels, a valve apparatus which receives fluid pressures of wheel cylinders of the front wheels. The valve apparatus is arranged between the pair of front wheels and the pair of rear wheels such that when either one of the fluid pressure control valve devices starts to control the fluid pressure of one of the rear wheels, the rear wheel that is on the same side of the vehicle as the front wheel having the lower fluid pressure is controlled in accordance with the lower one of the fluid pressures of the wheel cylinders of the front wheels by the valve apparatus.

In the above-described anti-skid control apparatus, the control signals of the control unit are formed by judging the skid conditions of the respective front wheels. On the assumption that the front and rear wheels are provided with the same kind of tires, the braking forces are so distributed to the wheels that the front wheels tend to lock sooner than the rear wheels when the vehicle is rapidly braked on a road which is uniform in frictional coefficient.

However, when the above assumption is not fulfilled, for example, when only the front wheels are provided with spike tires or chains for running on a snow or ice road and the rear wheels are provided with the normal tires, the rear wheels tend to lock sooner than the front wheels. In the above anti-skid control apparatus, the brake fluid pressure is not controlled with the locking of the rear wheel. When the brake fluid pressure of the front wheel is controlled over the limit locking pressure of the rear wheel, the locking of the rear wheel is not released, and so the steering stability cannot be maintained.

Even in the case where the front and rear wheels are provided with the tires of the same kind, the rear wheel may tend to lock sooner than the front wheel when the frictional coefficient of the brake lining becomes excessively low due to thermal fade phenomenon in the front wheel brake apparatus and the limit lock pressure of the front wheel becomes excessively high. This is particularly problematic when the vehicle is rapidly braked on a high coefficient of friction road. When a proportioning valve is used, the fluid pressure of the rear wheel is lower than that of the front wheel. However, it increases in proportion to the fluid pressure of the front wheel, and reaches the limit lock pressure. Again, the above described problem occurs.

FIG. 1 diagramatically shows the above described problem. FIG. 1A shows the changes of the wheel speeds during the time when the vehicle is braked. FIG. 1B shows the control signals of the control unit. And FIG. 1C shows the changes of the brake fluid pressures of the wheels.

When the front and rear wheels are provided with tires of the same kind, and they run on the road that is uniform in frictional coefficient, the brake fluid pressures P and P′ of the front and rear wheels change with time, as shown by the solid lines in FIG. 1C, when the brake pedal is trodden at time t0. The control unit generates a brake maintaining instruction at time t1. The fluid pressure control valve device is constituted by an inlet valve and an outlet valve. The control signals consist of signals EV and AV for the inlet and outlet valves, respectively.

Although AV is still "0", EV becomes "1" at time t1. Thus, the brake fluid pressure P of the front wheel is maintained constant. The control unit generates a brake relieving instruction at time t2. Thus, EV is still "1", and AV becomes "1" from "0". As shown in FIG. 1C, the brake fluid pressure P of the front wheel decreases. AV becomes "0" at time t3, while EV is still "1". Thus, the brake fluid pressure is maintained constant.

EV becomes "0" at time t4. The brake fluid pressure rises again. EV brakes again "1" at time t5. The brake fluid pressure is maintained constant. Hereafter, the brake pressure P increases in a stepwise manner as described above. AV becomes "1" at time t6, while EV is "1." Accordingly, the brake fluid pressure P decreases.

As described above, the brake fluid pressure P of the front wheel changes with time. The brake fluid pressure P′ of the rear wheel is reduced by the proportioning valve, and changes with time in accordance with the brake pressure P of the front wheel. The proportioning valve causes the hysteresys phenomenon by which the brake fluid pressure P′ of the rear wheel changes a little later than that P of the front wheel. However, such a time lag is neglected in FIG. 1C.

Generally, a larger amount of brake fluid is required for a constant increase of brake fluid pressure in the lower pressure range under the influence of rigidity of the wheel cylinder in the rear wheel brake apparatus. Accordingly, the change range of the brake fluid pressure P′ of the rear wheel is less than that of the front wheel, as shown in FIG. 1C.

The wheel speeds V, V′ of the front and rear wheels change with time, as shown by the solid lines in FIG. 1A, in accordance with the above described changes of the brake fluid pressures. The preferable anti-skid control is effected. The wheel speeds are decreased without looking of the wheels.

However, when only the front wheels are provided with chains, or when the thermal fade phenomenon occurs in the front brake apparatus, the limit lock pressure of the front wheel is increased. In such a case, the brake fluid pressure P of the front wheel changes with time, as shown by dash lines in FIG. 1A. It changes above the level of the brake fluid pressure shown by the solid line. On the other hand, the brake fluid pressure P of the rear wheel changes beyond the rear limit lock pressures R, as shown by the dash line. Hereafter, even when the brake fluid pressure P of the front wheel is decreased, the rear wheel cannot be relieved from locking, partly because the range of the change of the brake fluid pressure P′ is too small. The front wheel is prevented from locking, as shown by the dash line in FIG. 1A. However, the rear wheel is locked. The anti-skid control is not preferably effected. The steering stability is lost and a very dangerous situation results.

SUMMARY OF THE INVENTION

Accordingly, it is an object of this invention to provide an anti-skid control apparatus for a vehicle braking system which can be small size and lightweight, and can avoid the problem of locking of rear wheels in all cases.

In accordance with an aspect of this invention, the anti-skid control apparatus for a vehicle braking system includes: (A) a pair of front wheels, and a pair of rear wheels, (B) wheel speed sensors associated with the wheels; (C) a first fluid pressure control valve device, for controlling the brake fluid pressure of the wheel cylinder of one of the front wheels, arranged between a first fluid pressure generating chamber of a tandem master cylinder and the wheel cylinder of one of the front wheels; (D) a second fluid pressure control valve device, for controlling the brake fluid pressure of the wheel cylinder of another of the front wheels, arranged between a second fluid pressure generating chamber of the tandem master cylinder and the wheel cylinder of the other of the front wheels; (E) a control unit receiving outputs of the wheel speed sensors for measuring or judging the skid conditions of the front and rear wheels and for generating instructions for controlling the first and second fluid pressure control valve devices; and (F) a valve apparatus, for generating a fluid pressure in accordance with the lower one of the brake fluid pressures of the front wheels, controlled by the first and second fluid pressure control valve devices and arranged between the wheel cylinders of the front wheels and those of the rear wheels. The improvement in which the control unit discriminates the frictionally lower side of the road on which the wheels are running on the basis of the outputs of he speed sensors, and combines logically the measuring or judging result of the skid condition of the rear wheel running on the frictionally lower side of the road with that of the front wheel running on the same frictionally lower side of the road to generate the instruction for controlling the first or second fluid pressure control valve device, and to generate the instruction for controlling the second or first fluid pressure control valve device, on the basis of the measuring or judging result of the skid condition of the other front wheel, independently of the condition of the rear wheels.

The foregoing and other objects, features, and advantages of the present invention will become more readily apparent upon consideration of the following detailed description of the preferred embodiments of the invention, taken in conjunction with the accompanying drawings.

DESCRIPTION OF THE PREFERRED EMBODIMENTS

Figure 1:
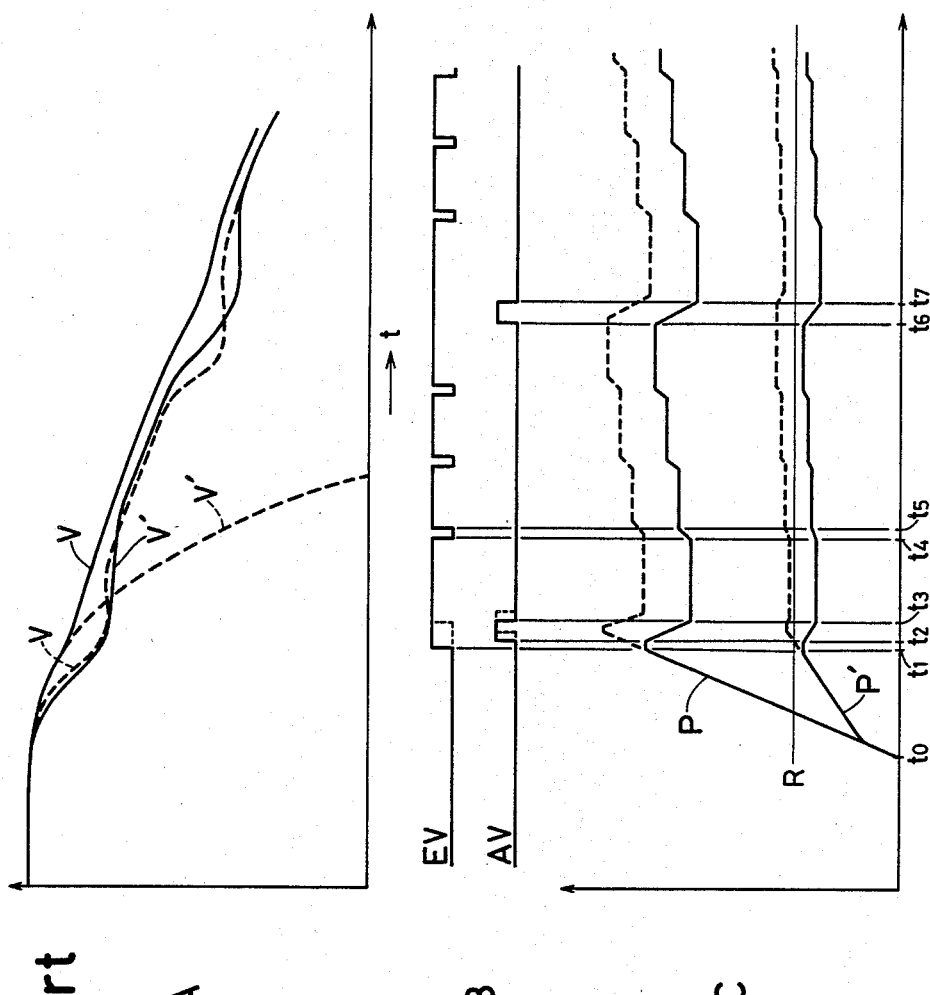
FIGS. 1A, 1B and 1C are graphs for explaining operations of a prior art anti-skid control apparatus.
Figure 2:
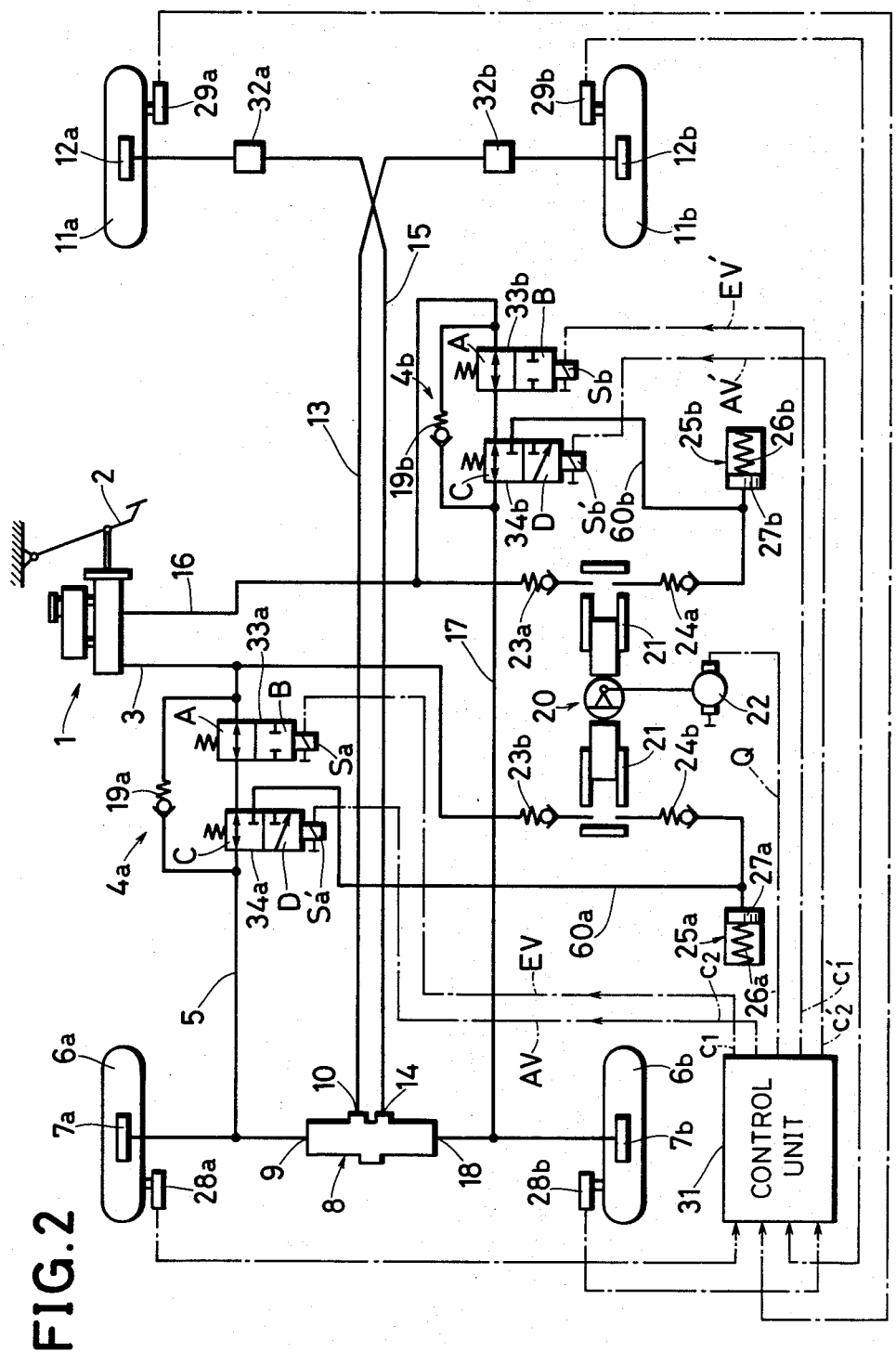
FIG. 2 is a schematic view of an anti-skid control apparatus according to an embodiment of this invention.

In FIG. 2, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic two position valve device 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro magnetic two position valve device 4b and a conduit 17. The conduit 17 is further connected to a second input port 18 of the valve apparatus 8. The second input port 18 normally communicates with a second output port 14 in the valve apparatus 8. The second output port 14 is connected to a wheel cylinder 12a of a right wheel 11a through a conduit 15 and a proportioning valve 32a.

The two position valve devices 4a and 4b consist of inlet and outlet valves 33a, 34a and 33b, 34b, respectively. Discharge openings of the outlet valves 34a and 34b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserve chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Wheel speed sensors 28a, 28b, 29a and 29b are associated with the wheels 6a, 6b, 11a and 11b, respectively, and they generate pulse signals having frequencies proportional to the rotational speeds of the wheels 6a, 6b, 11a and 11b. The pulse signals of the wheel speed sensors are supplied to a control unit 31.

Figure 3:
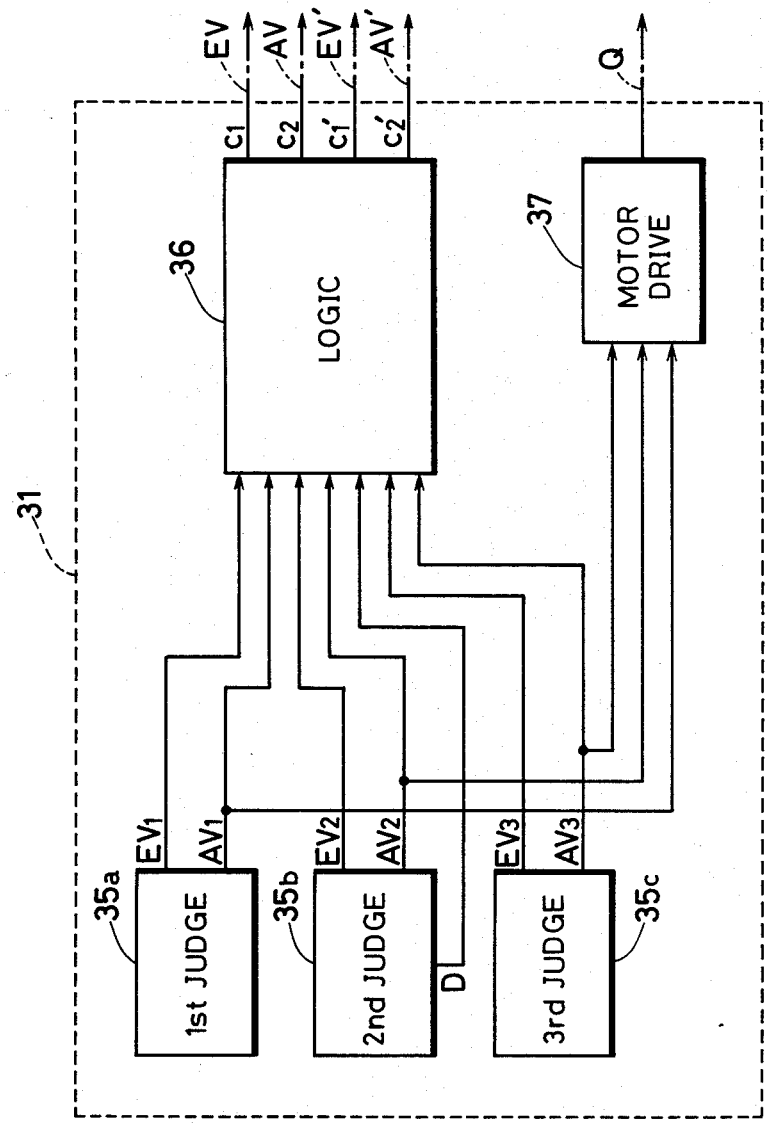
FIG. 3 is a block diagram of a control unit in FIG. 2.

As shown in FIG. 3, the control unit 31 consists of first, second and third judge circuits 35a, 35b and 35c, a logic circuit 36, and a motor drive circuit 37. The first and third judge circuits 35a and 35c are equal to each other in circuit construction. The circuits 35a, 35b, 35c, 36 and 37 will be hereinafter described in detail. Output terminals of the wheel speed sensors 28a and 28b are connected to input terminals of the first and third judge circuits 35a and 35c while output terminals of the wheel speed sensors 29b and 29a are connected to input terminals of the second judge circuit 35b. In other words, the first and third judge circuits 35a and 35c receive the wheel speed signals of the right front wheel 6a and left front wheel 6b, judges those wheel speed signals and supplies the judged results to the logic circuit 36. The second judge circuit 35b receives the wheel speed signals of the right and left rear wheels 11a and 11b and judges them. As will be described hereinafter, the lower one of the rear wheel speed signals is selected, and the judged result is formed on the basis of the lower signal.

The judged result is supplied to the logic circuit 36. The second judged circuit 35b includes a circuit to discriminate which is the lower of the speeds of the rear wheels 11a and 11b. The discrimination signal is supplied to the logic circuit 36. As will be hereinafter described, the judged results are logically combined with each other in the logic circuits 36 in consideration of the discrimination signal. Control signals EV and AV, and EV' and AV' are generated at output terminal C1 and C2 and C1' and C2' of the control unit 31. They are supplied to solenoid portions Sa, Sa', Sb and Sb' of the valves 33a, 34a, 33b and 34b, respectively. Dash lines represent electric lead wires.

Although schematically shown, the electromagnetic valves 33a, 34a, 33b and 34b have well-known constructions. When the control signals AV, EV and AV', EV' are "0," the valves take first positions A and C for increasing the brake pressure to the brake for the wheel, respectively. In the first positions A and C, the master cylinder side and the wheel cylinder side are made to communicate with each other. When the control signals AV, EV and AV', EV' and "1," the valves take second positions B and D for decreasing the brake pressure to the brake. In the second positions B and D, the communication between the master cylinder side and the wheel cylinder side is interrupted, while the communication between the wheel cylinder side and the reservoir side is made. The brake fluid is discharged through the conduits 60a and 60b into the reservoirs 25a and 25b, from the wheel cylinders 7a, 7b and 12a and 12b. When the control signals AV, AV' and EV, EV' are "0" and "1," respectively, the valves 33a and 33b take the second positions B, and the valves 34a and 34b take the first positions C. Thus, the brake pressure to the brake is maintained constant.

The control unit 31 further generates a drive signal Q for the motor 22, and it is maintained during the skid control operation.

Next, the details of the valve apparatus 8, to which the brake fluid pressures are applied from the wheel cylinders 7a and 7b of the front wheels 6a and 6b, will be described which reference to FIG. 4.

A stepped through hole 61a is axially formed in a casing 61 for the valve apparatus 8. A cover member 62 provided with a seal ring 65 is screwed to a right opening portion of the casing 61. Another cover member 66 provided with a seal ring 67 is screwed to a left opening portion of the casing 61. The above described first and second input ports 9 and 18 are formed in the cover members 62 and 66, respectively.

A piston 38, provided with seal rings 39 and 40, is slidably fitted to a central portion of the stepped hole 61a. Rod portions 41a and 41b of the piston 38 normally contact with valve balls 47a and 47b across output chambers 50a and 50b, respectively. The valve balls 47a and 47b are positioned in input chambers 49a and 49b, and are urged toward valve seats 46a and 46b by springs 48a and 48b. The one valve seat 46b is formed in the inner wall of the casing 61. The other valve seat 46a is formed in a valve forming member 45 which is press fit to a cylindrical member 44. The output chamber 50a is inside of the cylindrical member 44, and it communicates through holes 44a, made in the circumferential wall portion, with the first output port 10. The other output chamber 50b communicates directly with the second output port 14.

Spring receiving rings 42a and 42b are slidably fitted to the rod portions 41a and 41b of the piston 38 for receiving springs 43a and 43b. They are urged towards the center by the springs 43a and 43b. Normally, flange portions of the spring receiving rings 42a and 42b contact with stepped portions 58a and 58b of the casing 61. There are little gaps between the spring receiving rings 42a, 42b and a main portion 59 of the piston 38. Thus, the neutral position of the piston 38 is determined in the stepped hole 61a.

A switch 52 provided with a seal ring 53 is tightly fitted into a hole made in the central wall of the casing 61. An actuator of the switch 52 is engaged with a groove 51 made in the circumference of the piston 38, in the neutral position. An electric wire 54 from the switch 52 is connected through a contact 55 of a b-contact type relay, and a warning lamp 56 to a positive terminal of a battery 57. The warning lamp 56 is energized when the contact 55 remains closed and the switch 55 is operated. The contact 55 of the b-contact type relay normally remains closed, and when the anti-skid apparatus of FIG. 2 operates, it is opened. For example, when the fluid pressure pump 20 operates, it is opened.

In the shown neutral position of the piston 38, the valve balls 47a and 47b are separated from the valve seats 46a and 46b by the rod portions 41a and 41b. The input chambers 49a and 49b are made to communicate with the output chambers 50a and 50b.

In FIG. 2, check valves 19a and 19b are connected in parallel with the electromagnetic valves 4a and 4b. They permit brake fluid to flow only in the direction from the wheel cylinder side towards the master cylinder side. Both sides of the valves 4a and 4b communicate with each other through throttling holes in the A and C positions. Accordingly, pressurized fluid is rapidly returned through the check valves 19a and 19b to the master cylinder 1 from the wheel cylinders 7a, 7b, 12a and 12b, when the brake is released.

The first and third judge circuits 35a and 35c have the same circuit constructions. Accordingly, only the first judge circuit 35a will be described in detail with reference to FIG. 5A.

The signal from the wheel speed sensor 28a is supplied to a wheel speed signal generator 72a. Digital or analogue output proportional to the wheel speed is obtained from the wheel speed signal generator 72a, and it is supplied to an approximate vehicle or body speed signal generator 76a and a slip signal generator 77a and a differentiator 73a.

The approximate vehicle speed signal generator 76a receives the output of the speed signal generator 72a. The output of the approximate vehicle speed signal generator 76a is equal to the output of the wheel speed signal generator 72a, until the deceleration of the wheel reaches a predetermined value. After it becomes higher than the predetermined value, the outputs of the approximate vehicle speed signal generators 76a decreases at a predetermined gradient with time. The initial output is equal to the output at the time when the deceleration of the wheel has reached the predetermined value. The output of the approximate vehicle speed signal generator 76a is supplied to the slip signal generator 77a to be compared with the output of the wheel speed signal generator 72a. A predetermined reference ratio or amount is set in the respective slip signal generator 77a. The reference ratio or amount is for example, 0.15 (15%).

Generally, a slip ratio S of the wheel is given by the following formula:

$$S = 1 - \frac{\text{wheel speed }(V, V')}{\text{vehicle speed }(E)}$$

When $$\left(1 - \frac{(V, V')}{E}\right)$$

is larger than the reference ratio, a slip signal S is generated from the slip signal generator 77a, namely the output of the slip signal generator 77a, becomes a higher level "1" of the two levels "1" and "0."

The differentiator 73a receives the output of the wheel speed signal generator 72a, and differentiates it with respect to time. The output of the differentiator 73a is supplied to a deceleration signal generator 75a, and to an acceleration signal generator 74a. A predetermined threshold deceleration (for example, $-1.5$ g) is set in the deceleration signal generator 75a, and it is compared with the output of the differentiator 73a. A predetermined threshold acceleration (for example, 0.5 g) is set in the acceleration signal generator 74a, and it is compared with the output of the differentiator 73a. When the deceleration of the wheel becomes larger than the predetermined threshold deceleration ($-1.5$ g), a deceleration signal $-b$ is generated from the deceleration signal generators 75a. When the acceleration of the wheel becomes larger than the predetermined threshold acceleration (0.5 g), an acceleration signal $+b$ is generated from the acceleration signal generator 74a.

An output terminal of the acceleration signal generator 74a is connected to a negation input terminal (indicated by circle 0) of an AND gate 92a, a negation input terminal of an AND gate 90a, an OFF delay timer 88a, and a first input terminal of an OR gate 94a. An output terminal of the OFF delay timer 88a is connected to an input terminal of the AND gate 90a. An output terminal of the AND gate 90a is connected to an input terminal of a pulse generator 78a and an input terminal of an AND gate 93a. An output terminal of the pulse generator 78a is connected to a negation input terminal of the AND gate 93a. A stepwise brake increasing signal generator 81a, constituted by the acceleration signal generator 74a, the OFF-delay time 88a, the pulse generator 78a, the OR gate 94a, and the AND gates 90a, 93a, generate pulse signals to slowly increase the brake pressure for delay time of the OFF delay timer 88a. An output terminal of the AND gate 93a, is connected to a second input terminal of the OR gate 94a.

An output terminal of the deceleration signal generator 75a is connected to a third input terminal of the OR gate 94a and to an input terminal of the approximate vehicle speed signal generator 76a. An output terminal of the slip signal generator 77a is connected to another input terminal of the AND gate 92a. An output terminal of the AND gate 92a is connected to a fourth input terminal of the OR gate 94a.

Signals EV1 and AV1 at output terminals of the OR gate 94a and AND gate 92a are supplied to the following stage, or the logic circuit 36. The output terminal of the AND gate 92a is further connected to the motor drive circuit 37.

Similarly, in the third judge circuit 35c, signals EV3 and AV3 are formed in the same manner as above described, and an output terminal of an AND gate corresponding to the above described AND gate 92a is connected to the motor drive circuit 37.

Next, the details of the second judge circuit 35b will be described with reference to FIG. 5B.

The second judge circuit 35b receives the outputs of the wheel speed sensors 29a and 29b which are supplied to the wheel speed signal generators 72a' and 72b'. Outputs of the wheel speed signal generators 72a' and 72b' are supplied to a lower speed selector (so-called "select low") 120. The lower one of the wheel speeds is selected and is supplied to the same circuit portion as the above described first judge circuit 35a. For blocks corresponding to those in the first judge circuit 35a, the suffixes of the reference numerals are altered from a to b. Outputs EV2 and AV2 of OR gate and AND gate 92b are supplied to the logic circuit 36.

In the judge circuit 35b, the higher one of the wheel speeds is selected by a higher speed selector (so-called "select high") 200, and it is supplied to an approximate vehicle speed signal generator 76b.

The outputs of the speed signal generators 72a' and 72b' are further supplied to a comparator 121. The wheel speed signal VHR of the right rear wheel 11a is supplied to a (+) terminal of the comparator 121, while the wheel speed signal VHL of the left rear wheel 11b is supplied to (−) terminal of the comparator 121. Accordingly, when the signal VHR is higher than or equal to the signal VHL (VHR≧VHL), an output D of the comparator 121 becomes the higher "1" of the levels "0" and "1." And when the signal VHR is lower than the signal VHL (VHR<VHL), the output D of the comparator 121 becomes the lower "0" of the levels "0" and "1." The output D is supplied to the logic circuit 36.

Next, the details of the logic circuit 36 will be described with reference to FIG. 6.

The logic circuit 36 receives the outputs EV1, AV1, EV2, AV2, EV3, AV3 and D of the former stage. It is constructed symmetrically with respect to the outputs EV1, AV1 and EV3, AV3. The outputs EV1 and EV3 are supplied to first input terminals of first OR gates 100a and 100b, respectively. Outputs of first AND gates 102a and 102b are supplied to second input terminals of the OR gates 100a and 100b. Outputs of second OR gates 101a and 101b are supplied to third input terminals of the first OR gates 100a and 100b.

AV1Z and AV3Z, signals in the motor drive circuit 37 to be described hereinafter, are supplied through NOT gates 106 and 107 to one input terminals of the first AND gates 102a and 102b. Outputs of second AND gates 103a and 103b are supplied to other input terminals of the first AND gates 102a and 102b.

The output EV2 of the second judge circuit 35b is supplied to one input terminal of the second AND gates 103a and 103b. The output D of the second judge circuit 35b is supplied through a NOT gate 105 to another input terminal of the one second AND gate 103a, while it is supplied directly to another input terminal of the other second AND gate 103b.

The outputs AV1 and AV3 of the first and third judge circuits 35a and 35c are supplied to input terminals of the second OR gates 101a and 101b. Outputs of third AND gates 104a and 104b are supplied to other input terminals of the second OR gates 101a and 101b. The output D is supplied through the NOT gate 105 to one input terminal of the one third AND gate 104a, while the output AV2 of the second judge circuit 35b is supplied to another input terminal of the one third AND gate 104a. The output D is supplied directly to one input terminal of the other third AND gate 104b, while the output AV2 of the second judge circuit 35b is supplied to another input terminal of the other third AND gate 104b.

The outputs of the first OR gates 100a and 100b are amplified by amplifiers 108a and 108b. Outputs of the amplifiers 108a and 108b correspond to the above-described outputs EV and EV', respectively. The outputs of the second OR gates 101a and 101b are amplified by amplifiers 109a and 109b. Outputs of the amplifiers 109a and 109b correspond to the above-described outputs AV and AV', respectively.

Figure 7:
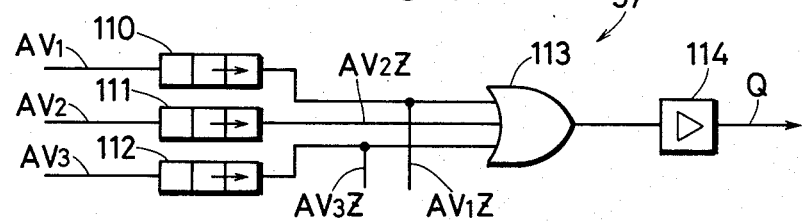
FIG. 7 is a circuit diagram of a motor drive circuit in FIG. 3.

Next, the details of the motor drive circuit 37 will be described with reference to FIG. 7.

The motor drive circuit 37 consists of OFF delay timers 110, 111, 112 and OR gate 113 receiving outputs of the timers 110, 111, 112 and an amplifier 114. The outputs AV1, AV2, AV3 of the judge circuits 35a, 35b, 35c are supplied to the OFF delay timers 110, 111, 112, respectively. Signals AV1Z, AV2Z and AV3Z at the output terminals of the OFF-delay timers 110, 111, 112 are supplied to the OR gate 113. The delay time is sufficiently long to maintain the output of the OFF-delay timers 110, 111, 112 at the higher "1" of the two levels "1" and "0" during the anti-skid control operation, after the outputs AV1, AV2, AV3 become the lower level "0" of the two levels "1" and "0."

Figure 6:
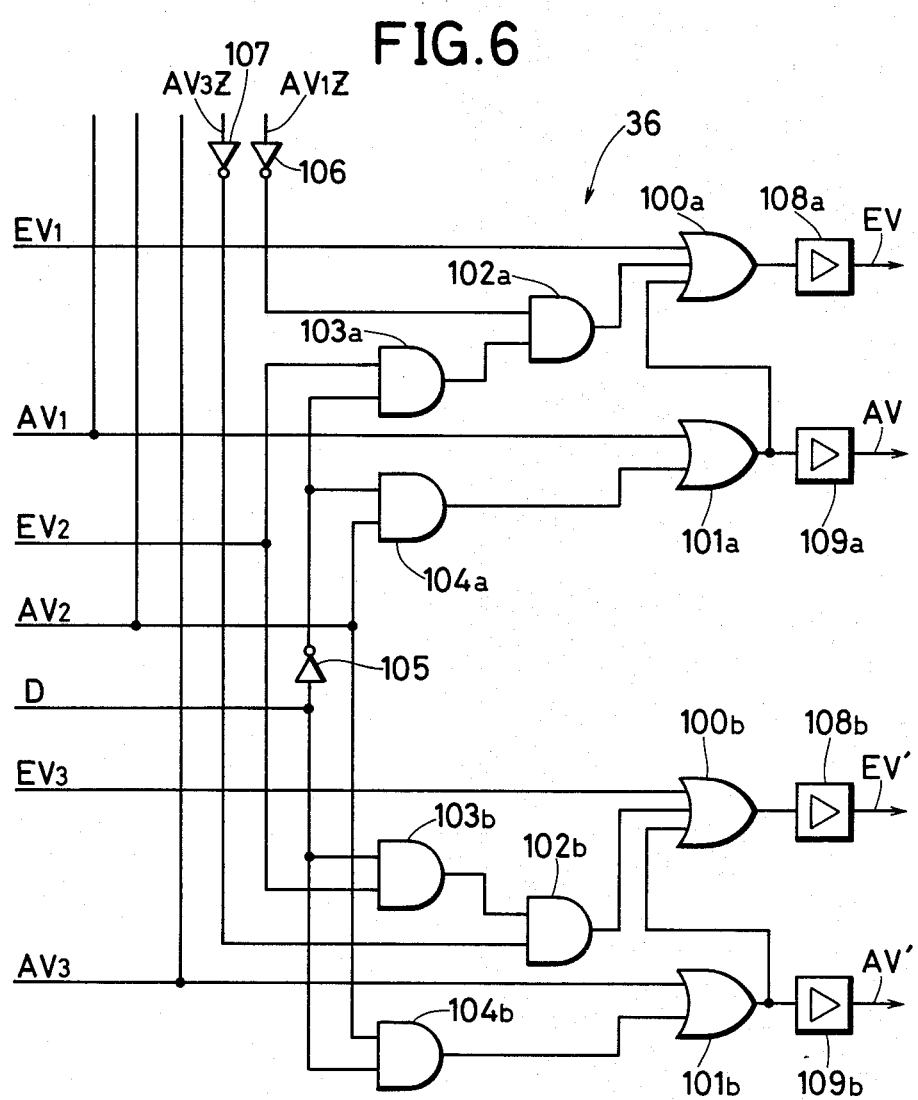
FIG. 6 is a circuit diagram of a logic circuit in FIG. 3.

The signals AV1Z and AV3Z are further supplied to the NOT gates 106 and 107 of the logic circuit 36 in FIG. 6. The output of the OR gate 113 is amplified by the amplifier 114. The output of the amplifier 114 corresponds to the above described motor drive signal Q.

Next, there will be described operations of the above described anti-skid apparatus.

It is now assumed that the wheels 6a, 6b, 11a and 11b are provided with the tires of the same kind and run on the road which is uniform in frictional coefficient.

The vehicle driver treads the brake pedal 2. At the beginning of the braking, the control signals EV, AV, EV', AV' are "0" from the control unit 31. Accordingly, the valves 33a, 33b and 34a, 34b are in the A position and the C position. Pressurized fluid is supplied from the master cylinder 1 to the wheel cylinders 7a and 7b of the front wheels 6a and 6b through the conduits 3, 16, the valves 33a, 33b, 34a, 34b and the conduits 5, 17. Further, it is supplied to the wheel cylinders 12a, and 12b of the rear wheels 11a and 11b through the first and second input ports 9, 18, the input chambers 49a, 49b, the output chambers 50a, 50b, the first and second output ports 10, 14 in the valve apparatus 8, and the conduits 13 and 15. Thus, the wheels 6a, 6b, 11a and 11b are braked. The proportioning valves 32a and 32b effect the well-known operations as follows. When the input pressure is lower than a predetermined value it transmitted to the output side without reduction. When the input pressure is higher than the predetermined value, it is reduced nearly at a constant rate, and transmitted to the output side.

When the deceleration of the wheels 6a, 6b, 11a and 11b becomes higher than the predetermined deceleration with the increase of the brake fluid pressure, the deceleration signal −b is generated from the deceleration signal generators 75a (designated representatively) in the judge circuits 35a, 35b and 35c. For facilitating the understanding, it is assumed that the decelerations or slips of the wheels 6a, 6b, 11a, 11b change equally and reach the predetermined deceleration or slip at the same time.

The signals EV1, EV2, EV3 become "1" with the deceleration signal −b. The output signals EV, EV' of the logic circuits 36 becomes "1" with the signals EV1, EV2, EV3. The solenoid portions Sa and Sb are energized. The valves 33a and 33b take the second position B. The conduits 3, 16 are interrupted from the conduits 5, 17. Further, the conduits 5, 17 are interrupted from the conduits 60a, 60b. Thus the brake fluid pressures of the wheel cylinders 7a, 7b, 12a, and 12b are maintained constant.

When the deceleration of the wheels becomes lower than the predetermined deceleration, the deceleration signal −b disappears from the deceleration signal generators 75a and the valves 33a, 33b are again changed into the position A. Thus, the brake fluid pressure again increases. When the slip of the wheels reaches the predetermined slip, the slip signal S is generated from the slip signal generators 77a. The acceleration signal generators 74a does not yet generate the acceleration signal +b. Accordingly, the output AV1, AV2, AV3 of the AND gates 92a become "1". The outputs AV, AV' EV, EV' of the logic circuit 36 become "1". The valves 33a, 33b and 34a, 34b are changed over into the positions B and D. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13 the output ports 14, 10, the output chambers 50b, 50a, the input chambers 49b, 49a, the input ports 18, 9 in the valve apparatus 8, and the conduits 17, 5, 60b and 60a, into the hydraulic reservoirs 25a and 25b. Thus the brakes of the wheels 6a, 6b, 11a and 11b are relieved.

The fluid pressure pump 20 starts to drive with the signals AV1, AV2, or AV3. The brake fluid is sucked from the reservoirs 25a and 25b and supplied towards the conduits 3 and 16, nearly at the same rate by the fluid pressure pump 20. Accordingly, the fluid pressures at both sides of the piston 38 are decreased nearly at the same rate. The piston 38 remains stopped at the neutral position, and the valve balls 47a and 47b remain separated from the valve seats 46a and 46b.

When the wheel speeds become higher, and the accelerations of the wheels reach the predetermined acceleration, the acceleration signal +b is generated from the accelerator signal generators 74a. Thus, the outputs EV1, EV2, EV3 of the judge circuits 35a, 35b and 35c become "1". The outputs EV, EV' of the logic circuit 36 become "1". Accordingly, the brake fluid pressure of the wheels is maintained constant.

The pulse generator 78a starts to drive with the disappearance of the acceleration signal +b. The outputs EV1, EV2, EV3 change as "0", "1", "0", "1", . . . for the delay time of the OFF-delay timers 88a. Accordingly, the outputs EV, EV' of the logic circuit 36 change similarly. The brake pressures of the wheels increase in a stepwise fashion.

Hereafter, the above described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valve apparatus 8, the valves 4a, 4b, the check valves 19a and 19b.

In the above description, the control signals EV1, EV2, EV3 or AV1, AV2, AV3 become "0" or "1" at the same time. However, when the frictional coefficients of the road are considerably different at the right and left sides, the control signals do not become "0" or "1" at the same time. For example, when the frictional coefficient of the right side of the road is relatively small, the control signal EV1, EV2 or AV1, AV2 first becomes "1". Next, such a case will be described.

For simplifying the description, it is assumed that the deceleration signals −b or slip signals of the right wheels 6a, 11a are generated at the same time. In other words, the outputs EV1, EV2 or AV1, AV2 of the first and second judge circuits 35a, 35b become "0" or "1" at the same time. In the second judge circuit 35b, the wheel speed of the rear wheel 11a running on the lower frictional coefficient side of the road is selected by the selector 120. The skid condition is judged on the basis of the thus selected wheel speed. Since the wheel speed of the rear right wheel 11a is lower than that of the rear left wheel 11b, the output D of the comparator 121 becomes "0", and it is supplied to the logic circuit 36. However, since it is assumed that the front and rear wheels 6a, 11a, running on the same lower side of the road decelerate at the same rate [for facilitating the understanding], the outputs EV2, AV2 of the second judge circuit 35b have no influence on the outputs of the OR gates 100a, 101a in the logic circuit 36.

The output EV or AV of the logic circuit 36 becomes "0" or "1" with the output EV1 or AV1. The brake fluid pressure of the right front wheel 6a is maintained constant or decreased by functions of the valves 33a, 34a. The left front wheel 6b on the higher frictional road side (high side) does not yet tend to lock. Accordingly, the outputs EV3, AV3 of the third judge circuit 35a are "0".

Since the wheel speed of the left rear wheel 11b is higher than that of the right rear wheel 11a, the output D of the comparator 121 is "0". Accordingly, although the outputs EV2, AV2 of the second judge circuit 35b become "1", the outputs of the AND gates 103b, 104b are "0". Accordingly, the outputs EV', AV' of the logic circuit 36 are "0". The valves 33b, 34b are not energized. The brake fluid pressure of the front wheel 6b continues to rise.

Figure 4:
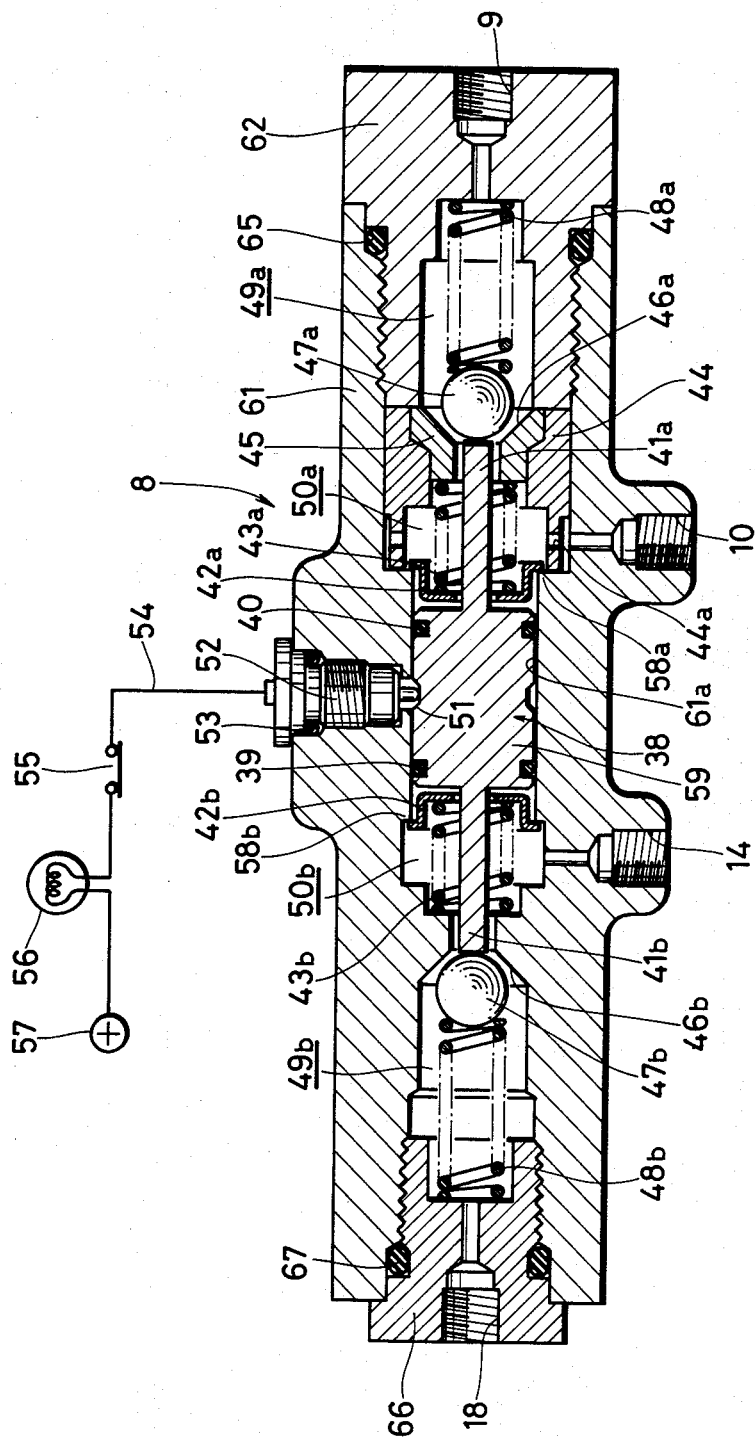
FIG. 4 is an enlarged cross-sectional view of a valve apparatus in FIG. 2.

In the valve apparatus 8 shown in FIG. 4, the fluid pressure is decreased in the input and output chambers 49a and 50a at the right side of the piston 38. On the other hand, the brake fluid continues to be supplied to the wheel cylinders 7b and 12a from the master cylinder 1. Accordingly, the rightward pushing force to the piston 38 becomes larger. The piston 38 is moved rightwards. Thus, the left valve ball 47b comes to seat in the valve seat 46b by spring action of the spring 48b. On the other hand, the right valve ball 47a is further separated from the valve seat 46a by the rod portion 41a. The right input chamber 49a remains in communication with the right output chamber 50a, while the left input chamber 49b is interrupted from the left output chamber 50b. Thus, the fluid supply to the wheel cylinder 12a of the one rear wheel 11a is interrupted from the master cylinder 1.

When the piston 38 is further moved rightwards with the decrease of the fluid pressure of the right input and output chambers 49a and 50a, the volume of the left output chamber 50b, interrupted from the left input chamber 49b, is increased. In other words, the fluid pressure of the wheel cylinder 12a of the rear wheel 11a is lowered since the wheel cylinder 12a communicates with the left output chamber 50b through the output port 14 and the conduit 15.

When the control signals EV, AV again become "0" to increase the fluid pressure of the input and output chambers 49a and 50a, the piston 38 is moved leftwards to decrease the volume of the left output chamber 50b, while the left valve ball 47b seats in the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinder 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked. Since the brake fluid pressure of the front wheel 6b on the high side is independently controlled, the brake distance is not lengthened in vain.

The above description relates to the situation where all of the wheels are provided with the tires of the same kind. Next, there will be described the case in which only the front wheels 6a, 6b are provided with spike tires or chains. It is assumed that the vehicle runs on the split road, the frictional coefficients of which are considerably different at the right and left sides, and further it is assumed that the right front and rear wheels 6a, 11a run on the low- side and the left front and rear wheels 6b, 11b run on the high- side.

Figure 8:
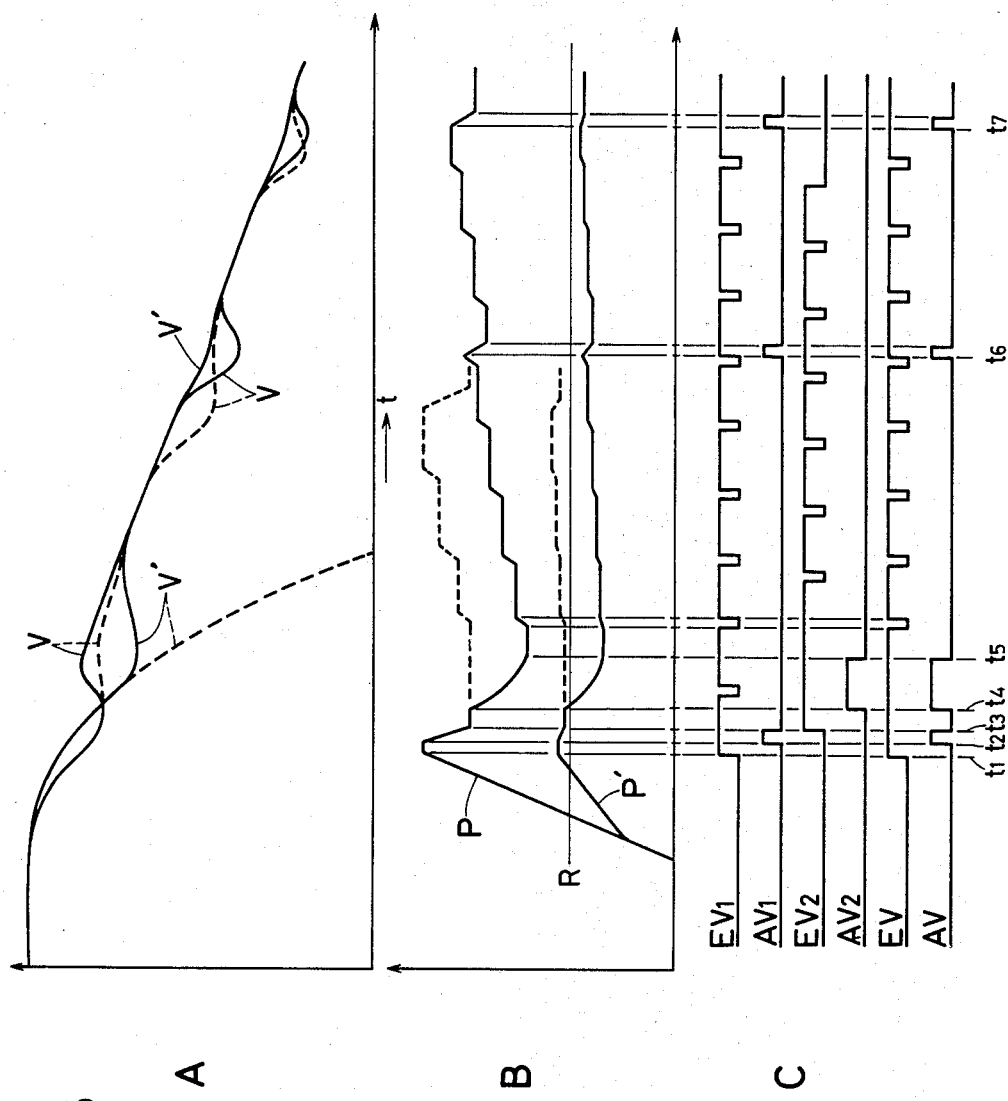
FIGS. 8A–C and FIGS. 9A–C are graphs for explaining operations of the embodiment of this invention.

When the brake pedal 2 is rapidly trodden, the brake fluid pressure P of the front wheel 6a increases as shown in FIG. 8B. The output EV1 of the first judge circuit 35a becomes "1" at time t1. Accordingly, the output EV of the logic circuit 36 becomes "1" at time t1 as shown in FIG. 8C. Thus, the brake fluid pressure P is maintained constant.

The output AV1 of the first judge circuit 35a becomes "1" at time t2. Accordingly, the output AV of the logic circuit 36 becomes "1" as shown in FIG. 8C. Thus, the brake fluid pressure P is decreased as shown in FIG. 8B. Although the output AV1 disappears at time t3, the output EV1 is still "1". Accordingly, the output EV is "1", and the brake fluid pressure P is maintained constant.

The output AV2 of the second judge circuit 35b becomes "1" at time t4. Thus, the slip of the right rear wheel 11a reaches the predetermined value.

Figure 5A:
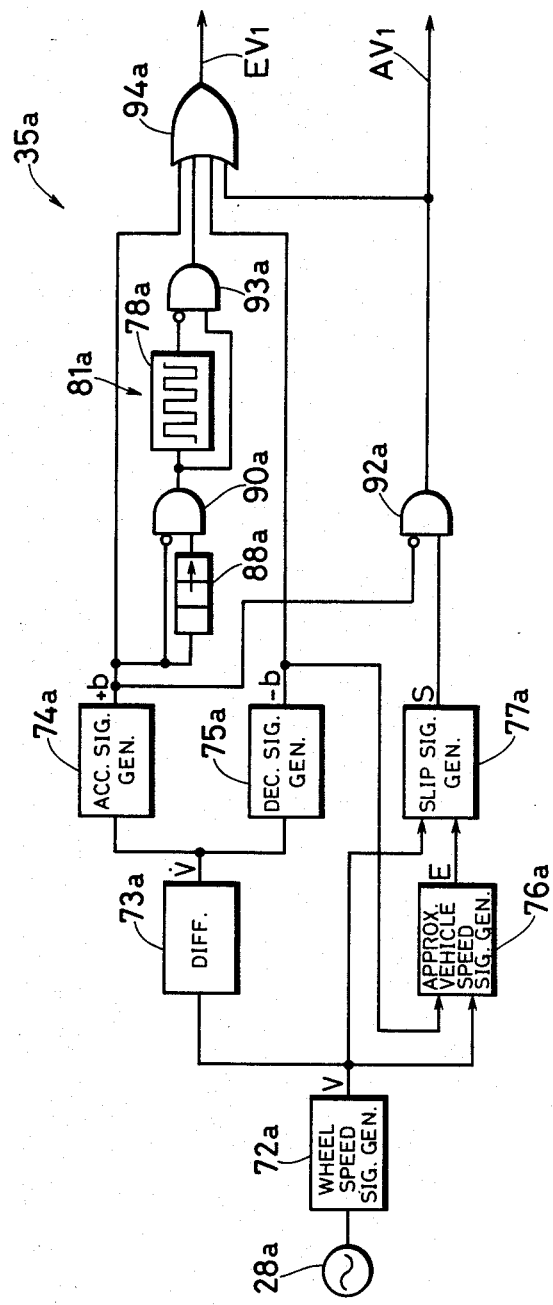
FIG. 5A is a circuit diagram of a first judge circuit in FIG. 3.
Figure 5B:
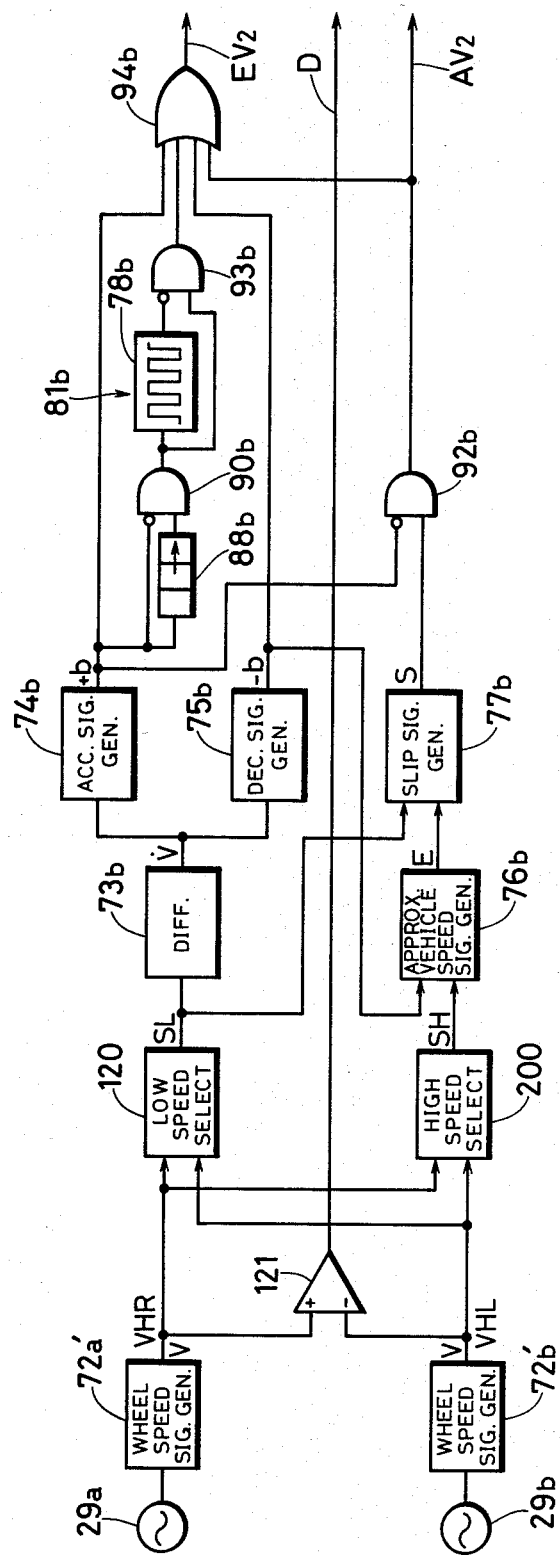
FIG. 5B is a circuit diagram of a second judge circuit in FIG. 3.

In FIG. 5B, the output of the wheel speed sensor 29a provided in the right rear wheel 11a is smaller than that of the wheel speed sensor 29b provided in the left rear wheel 11b. Accordingly, the output of the wheel speed signal generator 72a' is selected by the low speed selector 120 to judge the skid condition. The output D of the comparator 121 is "0". It is inverted by the NOT gate 105 in the logic circuit 36, and supplied to the one input terminals of the AND gates 103a, 104a. Before the output AV2 becomes "1", the output EV2 becomes "1", and it remains "1". Accordingly, the outputs of the AND gates 103a, 104a become "1". However, when the output EV2 becomes "1", the output EV1 of the first judge circuit 35a has been "1". Accordingly, it has no influence on the output EV of the OR gate 100a. The signal AV1Z is generated with the output AV1, of the first judge circuit 35a, and it is inverted by the NOT gate 106. The input to the other input terminal of the AND gate 102a becomes "0". Hereafter, the output EV2 of the second judge circuit 35b has no influence on the output EV of the logic circuit 36. The level of the output EV is determined by the outputs EV1, AV1 of the first judge circuit 35a and the output AV2 of the second judge circuit 35b. When the output AV2 becomes "1" at time t4, the brake fluid pressure P is decreased as shown in FIG. 8B. The output AV2 disappears at time t5. However, the output EV1 for the front wheel has become "1" again. Accordingly, the brake fluid pressure P is maintained constant.

Hereinafter, the output EV1 becomes periodically "0", "1", "0"... Accordingly, the brake fluid pressure P increases in a stepwise fashion as shown in FIG. 8B. The output AV1, and therefore the output AV become again "1" at time t6. The output EV is "1", while the output AV is "1". The brake fluid pressure P is decreased for the duration of the output AV.

As the result, the brake fluid pressure P of the front wheel 6a changes as shown in FIG. 8B. The wheel speed V of the front wheel 6a changes as shown in FIG. 8A. On the other hand, the brake fluid pressure P' of the rear wheel 11a changes by function of the valve apparatus 8, as shown in FIG. 8B, and the wheel speed V' of the rear wheel changes as shown in FIG. 8A. All of the wheels are prevented from locking. The brake fluid pressure of the left front wheel 6b on the high side is increased independently of the locking tendency of the right rear wheel 11a. Thus, the required braking distance is not increased.

When the skid conditions of only the front wheels 6a, 6b are judged as in the prior art (where the approximate vehicle speed is determined from all of the wheels) and when the fluid pressure control valve devices 4a, 4b are controlled with the thus obtained judged results, the brake fluid pressures P, P' of the front and rear wheels would change as shown by the dash lines in FIG. 8B. The front wheel is skid controlled so as to be prevented from locking. However, the rear wheel is locked. Since the limit lock pressure of the front wheel is very high, the brake fluid pressure of the rear wheel would become higher than the limit lock pressure R. Although the brake fluid pressure of the rear wheel changes with the control of the brake fluid pressure of the front wheel, as shown by the dash lines in FIG. 8B, the change range of the fluid pressure of the rear wheel is small, and the brake fluid pressure of the rear wheel remains higher than the limit lock pressure R. As shown by the dash lines in FIG. 8A, the wheel speed of the front wheel is decreased under the skid control operation. However, the wheel speed of the rear wheel would rapidly become zero, or be locked. In FIGS. 8B and 8C, the time lag of the change of the brake fluid pressure of the rear wheel behind the change of the brake fluid pressure of the front wheel is neglected.

Next, there will be described the case that the front wheels are provided with spike tires or chains, and that the vehicle runs on the road which is uniform in frictional coefficient.

To simplify the description, it is assumed that both of the rear wheels 11a, 11b change equally.

Accordingly, in the second judge circuit 36b, the output of the low speed selector 120 corresponds to the outputs of the wheel speed signal generators 72a' and 72b' which are equal to each other. The output D of the comparator 121 is "1". Accordingly, the brake fluid pressure of the left front wheel 6b can also be controlled by the skid conditions of the rear wheels 11a, 11b, while the brake fluid pressure of the right front wheel 6b is controlled only by its skid condition independently of the skid conditions of the rear wheels 11a, 11b.

Figure 9:
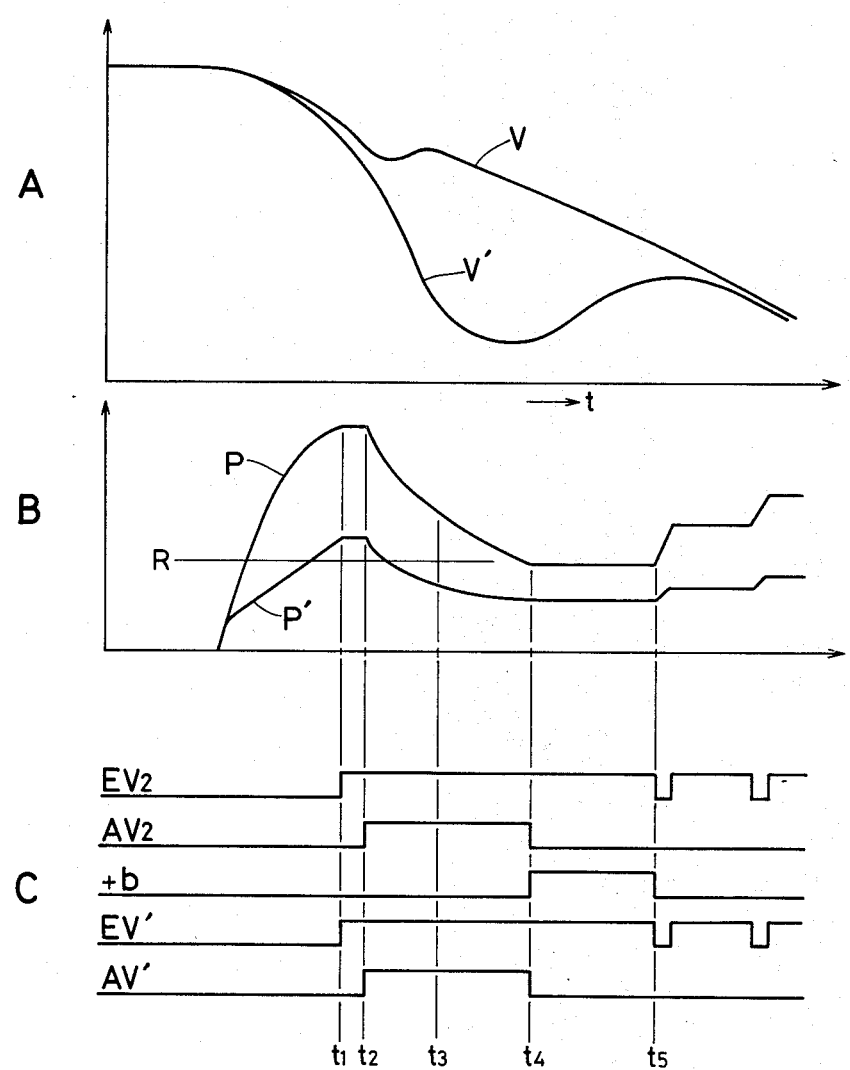

When the deceleration signal −b is generated from the deceleration signal generator 75b in the second judge circuit 35b at time t1, the output EV2 becomes "1" at time t1 as shown in FIG. 9C. It is supplied to the one input terminals of the AND gates 103a, 103b in the logic circuit 36. Since the output D of the comparator 121 is "1" in the second judge circuit 35b, the output of the one AND gate 103b becomes "1". However, since the output D is inverted, the output of the other AND gate 103a remains "0".

The output "1" of the AND gate 103b is supplied to the one input terminal of the following AND gate 102b. The signal AV3Z is supplied through the NOT gate 107 to the other input terminal of the AND gate 103b. Since the left front wheel 6b does not yet tend to lock, the outputs EV3, AV3 of the third judge circuit 35a are "0". Accordingly, the signal AV3Z is "0", and the input to the AND gate 102b is "1". The output of the AND gate 102b becomes "1" together with the output EV2 of the second judge circuit 35b. Accordingly, the output of the OR gate 100b or the output EV' of the logic circuit 36 becomes "1" as shown in FIG. 9C, and so the brake fluid pressure P of the front wheel 6b is maintained constant. The brake fluid pressure P of the other front wheel 6a continues to rise since the outputs EV, AV of the logic circuit 36 remain "0". Accordingly, the piston 59 is moved leftwards in the valve apparatus 8 of FIG. 4. The valve ball 47a comes to seat on the valve seat 46a. The wheel cylinder 7a of the right front wheel 6a is interrupted from the wheel cylinder 12b of the left rear wheel 11b. Since the brake fluid pressure P of the left front wheel 6b is maintained constant, the leftward movement of the piston 59 stops when the valve ball 47a contacts the valve seat 46a. As a result, the brake fluid pressure P' of the rear wheels 11a, 11b is maintained constant, as shown in FIG. 9B.

The slip signal S is generated from the slip signal generator 77b at time t2 in the second judge circuit 35b. Or the slip of the rear wheels 11a, 11b becomes larger than the predetermined slip. The output AV2 becomes "1". Thus, the output AV' of the logic circuit 36 becomes "1" at time t2, as shown in FIG. 9C. The brake fluid pressure P of the front wheel 6b decreases with time, as shown in FIG. 9B. Accordingly, the brake fluid pressure P' of the rear wheels 11a, 11b decreases by function of the valve apparatus 8.

The deceleration signal −b disappears at time t3 in the second judge circuit 35b. However the slip signal S remains generated, and therefore the outputs EV2 remain "1". Accordingly, the brake fluid pressures P and P' of the front and rear wheels 6a, 11a, 11b continue to decrease as shown in FIG. 9B.

The acceleration signal +b is generated from the acceleration signal generators 74b at time t4 in the second judge circuit 35b. Even when the slip signal S is still generated from the slip signal generators 77b, the output AV2 of the AND gate 92b becomes "0" However, the accelerator signal +b is supplied to the fourth input terminals of the OR gates 94b. Accordingly, the output EV2 of the OR gate 94b remain "1".

The output AV3Z is still "0". The outputs AV' of the logic circuit 36 becomes "0". However, the output EV remains "1" as shown in FIG. 9C. Accordingly, the brake fluid pressures P and P' of the front and rear wheels 6a, 11a, 11b are maintained constant.

The acceleration signal +b disappears at time t5. The pulse generator 81b starts to operate. The outputs EV2, and therefore, EV' change periodically as "0", "1", "0", "1", and, so on. Accordingly, the brake fluid pressures P and P' increase in a stepwise fashion as shown in FIG. 9B.

As described above, as soon as the rear wheels 11a, 11b tend to lock, the brake fluid pressure P' is maintained constant or decreased. Accordingly, although the brake fluid pressure P' may temporarily become higher than the limit lock pressure R, it can be rapidly lowered under the limit lock pressure R. The rear wheels are prevented from locking. The front wheels 6a, 6b, are controlled with the skid condition of the rear wheels 11a, 11b, before they tend to lock. Accordingly, the front wheels do not lock.

When the rear wheels do not equally change, the one front wheel is controlled with the skid condition of the rear wheel at the same side, the wheel speed of this rear wheel being lower than that of the other rear wheel.

The other rear wheel is controlled in accordance with the fluid pressure of the one front wheel through the valve apparatus 8.

Next, there will be described the case where one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including conduit 16 increases by treading the brake pedal 2. Accordingly, the piston 38 is moved rightwards in the valve apparatus 8. Since the anti-skid control is not effected, the contact 55 remains closed. The switch 52 is actuated with the movement of the piston 38. Electric current flows through the warning lamp 56 from the battery 57. The warning lamp 56 lights. Thus, the vehicle driver knows that the anti-skid apparatus has failed. When the anti-skid apparatus does not fail, the contact 55 is opened with the beginning of the anti-skid control operation (for example, the beginning of the drive of the fluid pressure pump 20). Accordingly, the warning lamp 56 does not light with the movement of the piston 38.

While the preferred embodiment has been described, variations thereto will occur to those skilled in the art within the scope of the present inventive concepts as set forth in the claims.

For example, the judge circuit is not limited to that of FIG. 5A or FIG. 5B, but a well-known judge circuit may be applied to this invention.

Further, in the above embodiment, the fluid pressure control valves 4a and 4b consist of inlet and outlet valves 33a, 34a, and 33b, 34b, respectively. However, the outlet valves 33a, 33b, and 34a, 34b, may each consist of a single three-position valve.

In the above embodiment, the diagonal or X-type conduit system has been described. Instead, a front-rear separation conduit system or H-connection conduit system may be applied to this invention. In that case, for example, the valve apparatus for H connection disclosed in the U.S. Ser. No. 760,356 filed by the same Assignee as this application may be used.

In the above embodiment, the approximate vehicle speed signal is formed on the basis of the higher wheel speed signal of the rear wheels and on the basis of the wheel speed signals of both of the front wheels. Instead, it may be formed on the basis of the highest wheel speed signal of both of the front and rear wheels.

Further, in the above embodiment, the proportioning valves 32a and 32b are arranged between the valve apparatus 8 and the wheel cylinders 12a and 12b. However, these valves may be omitted.

Further, in the above embodiment, the lower one of the wheel speed signals of the rear wheels is detected as shown in FIG. 5B, for discriminating the frictionally lower one of the sides of the road on which the wheels are running. However, the frictionally lower one of the sides of the road may be discriminated by the fact of which of the rear wheels reaches a predetermined skid condition sooner.

Accordingly, the brake fluid pressures P and P' of the front and rear wheels 6a, 11a and 11b continue to decrease as shown in FIG. 9B.

The acceleration signal +b is generated from the acceleration signal generators 74b at time t4 in the second judge circuit 35b. Even when the slip signal S is still generated from the slip signal generators 77b, the output AV2 of the AND gate 92b become "0". However, the accelerator signal +b is supplied to the fourth input terminals of the OR gates 94b. Accordingly, the output EV2 of the OR gate 94b remain "1".

The outputs AV3Z is still "0". The output AV' of the logic circuit 36 becomes "0". However, the output remains "1", as shown in FIG. 9C. Accordingly, the brake fluid pressures P and P' of the front and rear wheels 6a, 11a, 11b are maintained at constant.

The acceleration signal +b disappears at time t5. The pulse generator 81b start to operate. The outputs EV2, and therefore EV' change periodically as "0", "1","0", "1", and so on. Accordingly, the brake fluid pressures P and P' increase in a stepwise fashion, as shown in FIG. 9B.

As described above, as soon as the rear wheels 11a, 11b tend to lock, the brake fluid pressure P' is maintained constant or decreased. Accordingly, although the brake fluid pressure P' may temporarily become higher than the limit lock pressure R, it can be rapidly lowered under the limit lock pressure R. The rear wheels are prevented from locking. The front wheels 6a, 6b are controlled with the skid condition of the rear wheels 11a, 11b, before they tend to lock. Accordingly, the front wheels do not lock.

When the rear wheels do not equally change, the one front wheel is controlled with the skid condition of the rear wheel being lower than that of the other rear wheel.

The other rear wheel is controlled in accordance with the fluid pressure of the one front wheel through the valve apparatus Next, there will be described the case where one of the two conduit systems fails.

For example, when brake fluid leaks from the one conduit system including the conduit 3, the fluid pressures of the wheel cylinders 7a and 12b do not increase by treading the brake pedal 12. on the other hand, the fluid pressures of the other conduit system including the conduit 16 increases by treading the brake pedal 2. Accordingly, the piston 38 is moved rightwards in the valve apparatus 78. Since the anti-skid control is not effected, the contact 55 remains closed. The switch 52 is actuated with the movement of the piston 38. Electric current flows through the warning lamp 56 from the battery 57. The warning lamp 56 lights. Thus, the vehicle driver knows that the anti-skid apparatus has failed. When the anti skid apparatus does not fail, the contact 55 is opened with the beginning of the anti-skid control operation (for example, the beginning of the drive of the fluid pressure pump 20). Accordingly, the warning lamp 57 does not light with the movement of the piston 38.

While the preferred embodiment has been described, variations thereto will occur to those skilled in the art within the scope of the present as set forth in the claims.

For example, the judge circuit is not limited to that of FIG. 5A or FIG. 5B, but a well-known judge circuit may be applied to this invention.

Further, in the above embodiment, the fluid pressure control valves 4a and 4b consist of inlet and outlet valves 33a, 34a, and 33b, 34b, respectively. However, they may consist of a single three-position valve.

In the above embodiment the diagonal or X type conduit system has been described. Instead, a front-rear separation conduit system or H-connection conduit system may be applied to this invention. In that case, for example, the valve apparatus for H connection disclosed in the U.S. Ser. No. 760356 filed by the same Assignee as this application may be used.

In the above embodiment, the approximate vehicle speed signal is formed on the basis of the higher wheel speed signal of the rear wheels and on the basis of the wheel speed signals of both of the front wheels. Instead, it may be formed on the basis of the highest wheel speed signal of the both of the front and rear wheels.

Further, in the above embodiment, the proportioning valves 32a and 32b are arranged between the valve apparatus 8 and the wheel cylinders 12a and 12b. However, these valves may be omitted.

Further, in the above embodiment, the lower one of the wheel speed signals of the rear wheels is detected as shown in FIG. 5B, for discriminating the frictionally lower one of the sides of the road on which the wheels are running. However, the frictionally lower one of the sides of the road may be descriminated by the fact of which the rear wheels reaches a predetermined skid condition sooner.

What is claimed is:

1. An anti-skid control apparatus for a vehicle braking system, including:
   (A) A pair of front wheels and a pair of rear wheels each having a wheel cylinder, a brake and a wheel speed sensor associated therewith;
   (B) a tandem master cylinder having first and second fluid pressure generating chambers;
   (C) a first fluid pressure control valve device for controlling the brake fluid pressure of the wheel cylinder of one of said pair of front wheels, said first fluid pressure control valve being arranged between said first fluid pressure generating chamber of the tandem master cylinder and the wheel cylinder of said one of said pair of front wheels;
   (D) a second fluid pressure control valve device for controlling the brake fluid pressure of the wheel cylinder of the other one of said pair of front wheels, said second fluid pressure control valve being arranged between said second fluid pressure generating chamber of the tandem master cylinder and the wheel cylinder of said other one of said pair of front wheels;
   (E) a control means for receiving outputs of said wheel speed sensors, for measuring or judging the skid conditions of said front and rear wheels, and for generating instructions to control said first and second fluid pressure contol valve devices; and (F) a valve means, arranged between the wheel cylinders of said front wheels and the wheel cylinders of said rear wheels, for generating a fluid pressure in accordance with the lower one of the brake fluid pressures of said front wheels controlled by said first and second fluid pressure control valve devices, wherein said control means includes:

means for discriminating betwen the frictionally lower one of the sides of the road on which said whels are running on the basis of the outputs of said wheel speed sensors, means for combining logically the measuring or judging result of the skid condition of the rear wheel running on said frictionally lower side of the road with that of the front wheel running on the same frictionally lower side of the road, means for generating the instruction for controlling said first fluid pressure control valve device or said second fluid pressure control valve device, and for generating the instruction for controlling said second fluid pressure control valve device or said first fluid pressure control valve device on the basis of the measuring or judging result of the skid condition of the front wheel, independently of that of said rear wheels.

2. An anti-skid control apparatus according to claim 1, in which said control means detects the lower one of the wheel speeds of said rear wheels in order to discriminate said frictionally lower side of the road.

3. An anti-skid control apparatus according to claim 1, in which said measuring or judging results of the skid conditions of said front and rear wheels includes control signals for controlling the corresponding fluid pressure control valve device for relieving the brake pressure of said front or rear wheel and for maintaining the brake pressure of said front or rear wheel constant when said control signal is obtained from said front or rear wheel on the frictionally lower side of the road.

4. An anti-skid control apparatus according to claim 1, in which said valve means comprises a casing, a piston slidably fitted in said casing, input and output chambers formed at both sides of the piston, input ports communicating with said input chambers output ports communicating with said output chambers, and valve members arranged between said input and output chambers and operated by said piston, wherein one of said input ports is connected to the wheel cylinder of said one of said pair of front wheels, one of said output ports which communicates with the one of said output chambers being at the same side as the input chamber communicating with said one of the input ports is connected to the wheel cylinder of the one of said pair of rear wheels being at the opposite side of the raod as said one of aid pair of front wheels, the other of said input ports is connected to the wheel cylinder of said one of said pair of front wheels, the other of said output ports which communicates with the other of said output chambers being at the same side as the input chamber communicating with said other of the input ports is connected to the wheel cylinder of the other of said pair of rear wheels.

5. An anti-skid control apparatus according to claim 4, in which a fail detecting switch is engaged with said piston.

6. In an anti-skid control apparatus for a vehicle braking system including:

(A) a pair of front wheels, and a pair of rear wheels each having a wheel speed sensor and a wheel cylinder associated therewith;

(B) a tandem master cylinder having first and second fluid pressure generating chambers;

(C) a first fluid pressure control valve device for controlling the brake fluid of the wheel cylinder of one of said front wheels, arranged between a first fluid pressure generating chamber of a tandem master cylinder and said wheel cylinder of the one front wheel;

(D) a second fluid pressure control valve device for controlling the brake fluid pressure of the wheel cylinder of another of said front wheels, arranged between a second fluid pressure generating chamber of said tandem master cylinder and said wheel cylinder of the other front wheel;

(E) a control unit receiving outputs of said wheel speed sensors for measuring or judging the skid conditions of said front and rear wheels and for generating instuctions for controlling said first and second fluid pressure control valve devices; and (F) a valve apparatus for generating a fluid pressure in accordance with the lower one of the brake fluid pressures of said front wheels controlled with said first and second fluid pressure control valve devices, being arranged between said wheel cylinders of the front wheels and those of the rear wheels, said valve apparatus including a piston or pistons for receiving the brake fluid pressures of said front wheels movable by the difference between the controlled brake fluid pressures of said front wheels, and a pair of valves being able to open and close with the movement of said piston or pistons; said control unit comprises a discriminating circuit for discriminating the frictionally lower one of the sides of the road on which said wheels are running, on the basis of the outputs of said wheel speed sensors, and a control circuit for combining logically the measuring or judging result of the skid condition of the one rear wheel running on the one side which is discriminated as said frictionally lower side of the road by said discriminating circuit, with that of the one front wheel running on the same side as said frictionally lowwer one side, for generating the instruction for controlling said first or second fluid pressure control valve device, and generating the instruction for controlling said second or first fluid pressure control valve device, on the basis of the measuring or judging result of the skid condition of the other front wheel, independently of that of said rear wheels.

7. An anti-skid control apparatus according to claim 1, in which said discriminating circuit discriminates said frictionally lower one of the sides of the road by detecting the lower one of the wheel speeds of said rear wheels.

8. An anti-skid control apparatus according to claim 1, in which said measuring or judging results of the skid conditions of said front and rear wheels include control signals for relieving the brake of said front or rear wheel and for maintaining the brake pressure of said front or rear wheel constant, such that when said control signal is obtained from said front or rear wheel on the same frictionally lower road side said corresponding fluid pressure control valve device is controlled for relieving the brake fluid pressure or maintaining the brake fluid pressure constant.

9. An anti-skid control apparatus according to claim 1, in which said valve apparatus comprises a casing, a piston slideably fitted to said casing, input and output chambers formed at both sides of said piston, input ports communicating with said input chambers, output ports communicating with said output chambers, and valve members arranged between said input and output chambers and operated by said piston, wherein one of said input ports is connnected to the wheel cylinder of one of said pair of front wheels, one of said output ports which communicates with the one of said output chambers being at the same side as the input chamber communicating said other of the input ports, is connected to the wheel cylinder of the one of said pair of rear wheels being at the opposite side of the road.

10. An anti-skid control apparatus according to claim 4, in which a fail detecting switch is engaged with said piston.

* * * * *